US007385982B2

(12) United States Patent
Warden et al.

(10) Patent No.: US 7,385,982 B2
(45) Date of Patent: Jun. 10, 2008

(54) SYSTEMS AND METHODS FOR PROVIDING QUALITY OF SERVICE (QOS) IN AN ENVIRONMENT THAT DOES NOT NORMALLY SUPPORT QOS FEATURES

(75) Inventors: Gary G. Warden, Tipp City, OH (US); James A. Cunningham, Dayton, OH (US); Nathan A. Kragick, Beavercreek, OH (US)

(73) Assignee: Next Generation Systems, Inc., Dayton, OH (US)

( * ) Notice: Subject to any disclaimer, the term of this patent is extended or adjusted under 35 U.S.C. 154(b) by 989 days.

(21) Appl. No.: 10/409,233

(22) Filed: Apr. 8, 2003

(65) Prior Publication Data

US 2003/0189935 A1 Oct. 9, 2003

Related U.S. Application Data

(60) Provisional application No. 60/371,198, filed on Apr. 9, 2002.

(51) Int. Cl.
*H04L 12/28* (2006.01)

(52) U.S. Cl. .............. 370/392; 370/395.21; 370/395.3; 370/401; 709/240; 709/243; 710/317; 398/57

(58) Field of Classification Search ................ 370/412, 370/413, 415, 417, 395.21, 395.4, 395.42, 370/395.43

See application file for complete search history.

(56) References Cited

U.S. PATENT DOCUMENTS

| | | | | |
|---|---|---|---|---|
| 6,104,700 | A | 8/2000 | Haddock | |
| 6,201,813 | B1 * | 3/2001 | Klausmeier et al. | 370/412 |
| 6,442,164 | B1 | 8/2002 | Wu | |
| 6,597,669 | B1 * | 7/2003 | Takahashi et al. | 370/325 |
| 6,608,819 | B1 * | 8/2003 | Mitchem et al. | 370/253 |
| 6,718,139 | B1 * | 4/2004 | Finan et al. | 398/59 |
| 6,798,743 | B1 * | 9/2004 | Ma et al. | 370/235 |

(Continued)

OTHER PUBLICATIONS

American National Standard for Information Technology (ANSIT), "Fibre Channel Framing and Signaling (FC-FS)", NCITS, Rev 1.30, Jul. 9, 2001, pp. i-iii, 17-32, 78-91, 96, 117, 184-186, 303-308, 494-496, 647-648.*

(Continued)

*Primary Examiner*—Hassan Kizou
*Assistant Examiner*—Brian T O'Connor
(74) *Attorney, Agent, or Firm*—Sprinkle IP Law Group

(57) ABSTRACT

Systems and methods for providing fractional bandwidth communication channels in classes of service that do not normally support these types of channels. In one embodiment, a method comprises receiving one or more frames, wherein each frame contains non-QoS header information, classifying the one or more frames based on the corresponding non-QoS header information and scheduling delivery of the one or more frames based upon corresponding frame classifications, wherein frames in classifications corresponding to QoS circuits are scheduled in a manner that meets QoS requirements associated with the QoS circuits. When the frames are classified, they are forwarded to dynamically allocated queues corresponding to the respective classifications. Frames are scheduled for delivery from the queues according to a modified bin-filling algorithm that is designed to meet the QoS requirements of the respective circuits. This method may be implemented, for example, in a Fibre Channel Class 2 or Class 3 fabric.

27 Claims, 7 Drawing Sheets

U.S. PATENT DOCUMENTS 6,850,981 B1 * 2/2005 Ho et al. .................... 709/227
6,985,488 B2 * 1/2006 Pan et al. ................ 370/395.3
7,068,651 B2 * 6/2006 Schmidt et al. ............. 370/389
7,145,914 B2 * 12/2006 Olarig et al. ............... 370/413
7,237,058 B2 * 6/2007 Srinivasan .................. 711/108
2002/0163916 A1 * 11/2002 Oskouy et al. ........ 370/395.31
2003/0074468 A1 * 4/2003 Chang et al. ............... 709/238
2004/0083326 A1 * 4/2004 Wang et al. ................ 710/317
2005/0018604 A1 * 1/2005 Dropps et al. .............. 370/229

OTHER PUBLICATIONS

International Search Report for PCT/US03/10614 mailed Jul. 7, 2003.

* cited by examiner

| | | |
|---|---|---|
| R_CTL | Destination Identifier (D_ID) | |
| CS_CTL | Source Identifier (S_ID) | |
| TYPE | F_CTL | |
| Sequence ID | DF_CTL | Sequence Count |
| OX_ID | RX_ID | |
| Parameter | | |

Fig. 5

SYSTEMS AND METHODS FOR PROVIDING QUALITY OF SERVICE (QOS) IN AN ENVIRONMENT THAT DOES NOT NORMALLY SUPPORT QOS FEATURES

RELATED APPLICATIONS

This application claims priority to U.S. Provisional Patent Application No. 60/371,198, entitled "Method And Apparatus For Implementing A Quality Of Service (Qos) In A Fibre Channel System," by Gary G. Warden, et al., filed Apr. 9, 2002, which is fully incorporated by reference as if set forth in its entirety herein.

BACKGROUND

1. Field of the Invention

This invention relates generally to data communications and more particularly to systems and methods for implementing quality of service (e.g., minimum bandwidth and maximum latency guarantees) in environments (e.g., Fibre Channel Class 2 and Class 3 services) that do not normally support quality of service features.

2. Related Art

Computers and computer peripherals (collectively "devices") generally include at least one input/output (I/O) channel that allows communication with other devices. Communications between devices may be carried over various types of communication channels, such as Fibre Channel switching fabrics. While the present disclosure is applicable to other types of communication channels, Fibre Channel will be used to exemplify the problems of the prior art and corresponding solutions provided by the embodiments of the invention.

A Fibre Channel switching fabric may provide one of several different classes of service to its users. Each class of service provides different characteristics than the others. For example, Fibre Channel Class 1 provides point-to-point connections between devices. The connected devices are allocated 100 percent of the communication channel's bandwidth. Fibre Channel Classes 2 and 3, on the other hand, provide connectionless service. Many different devices may be connected by a Fibre Channel fabric that provides Class 2 or Class 3 service, but none of the devices is guaranteed any particular amount of bandwidth. Fibre Channel Class 4 provides virtual connections between devices, and a particular virtual connection may guarantee a certain bandwidth to the devices that communicate via the virtual connection.

While the Fibre Channel classes of service provide various features that are useful for different types of communication, each has its drawbacks. For example, Fibre Channel Class 1, which establishes connections between devices, may hinder the optimal performance of the fabric because particular switches within the Fibre Channel fabric are dedicated to the connection and may not be used for other communication channels. Thus, some communication channels may be completely blocked. Class 1 is, therefore, rarely used.

In Fibre Channel fabrics that provide Class 2 or Class 3 service, one communication channel will not block another because the channels are connectionless. In other words, they do not have switches that are dedicated to particular communication channels, so they do not block each other. Class 2 and Class 3 service, however, cannot allocate a portion of the available bandwidth to communications between particular devices and cannot provide any guarantees as to the bandwidth or latency of communications over the corresponding channels. Consequently, they are not suitable for transmissions of audio or video or other types of streaming or real-time data that have to be delivered in a timely manner. Class 2 and Class 3 are the prevalent classes of service in Fibre Channel fabrics.

Fibre Channel Class 4 establishes virtual connections between devices and provides guarantees as to the bandwidth and latency of communications over these virtual connections. Class 4 service can be used to provide fractional bandwidth circuits that allocate a fraction of the total bandwidth available to a particular virtual connection. Minimum bandwidth and maximum latency guarantees can then be provided as to this virtual connection. Class 4 is therefore capable of providing service that is suitable for use in transmitting audio, video and similar data that requires these guarantees. Fibre Channel Class 4, however, requires special Start-of-Frame (SoF) delimiters that identify the corresponding QoS connection and also requires the active participation of the communicating devices in order to set up the virtual connection. The devices have to be able to provide the specialized SoF delimiters, headers and other information required to set up the end-to-end virtual connections. Because of these requirements, Class 4 is widely considered to be impractical, and consequently has not been implemented.

Despite the various capabilities that are provided by the individual Fibre Channel classes of service, there is not a class of service that is currently available that is both efficient (e.g., non-blocking) and will adequately support the communication of data that requires bandwidth and latency guarantees. Moreover, there is not a class of service that is available or even defined that enables these requirements to be met for legacy devices (e.g., Fibre Channel Class 2 and 3 devices).

SUMMARY OF THE INVENTION

One or more of the problems outlined above may be solved by the various embodiments of the invention. Broadly speaking, the invention comprises systems and methods for providing fractional bandwidth communication channels in classes of service that do not normally support these types of channels. It should be noted that, while the specific embodiments described herein are implemented in the context of Fibre Channel Class 2 and Class 3 systems, the systems and methods disclosed herein are applicable to many different environments, and should be construed to include embodiments that are implemented in non-Fibre Channel environments.

In one embodiment, a method comprises receiving one or more frames, wherein each frame contains non-QoS header information, classifying the one or more frames based on the corresponding non-QoS header information and scheduling delivery of the one or more frames based upon corresponding frame classifications, wherein frames in classifications corresponding to QoS circuits are scheduled in a manner that meets QoS requirements associated with the QoS circuits. When the frames are classified, they are forwarded to dynamically allocated queues corresponding to the respective classifications. Frames are scheduled for delivery from the queues according to a modified bin-filling algorithm that is designed to meet the QoS requirements of the respective circuits. This method may be implemented, for example, in a Fibre Channel Class 2 or Class 3 fabric.

Another embodiment comprises a switch having one or more input ports, one or more output ports, one or more queues and a processor. The processor is coupled to the input ports, the output ports and the queues, and is configured to examine non-QoS headers of frames received at the input ports, classify the frames based on corresponding non-QoS header information, and schedule transmission of the frames based on the respective classifications of the frames from the output ports. The switch may include a decision buffer in which frames are stored and examined before being classified by the processor and forwarded to an appropriate queue. The switch may also include a deep buffer for receiving bursts of frames and storing them until they can be classified and forwarded to the proper queues. The queues may be dynamically allocated (e.g., as linked lists) from a pool of buffer space. A plurality of these switches may be combined, homogeneously or heterogeneously, to form a fabric that supports end-to-end QoS.

Numerous additional embodiments are also possible.

BRIEF DESCRIPTION OF THE DRAWINGS

Other objects and advantages of the invention may become apparent upon reading the following detailed description and upon reference to the accompanying drawings.

FIG. 5 is a diagram illustrating an exploded view of a frame header of a Fibre Channel frame.

Figure 1:
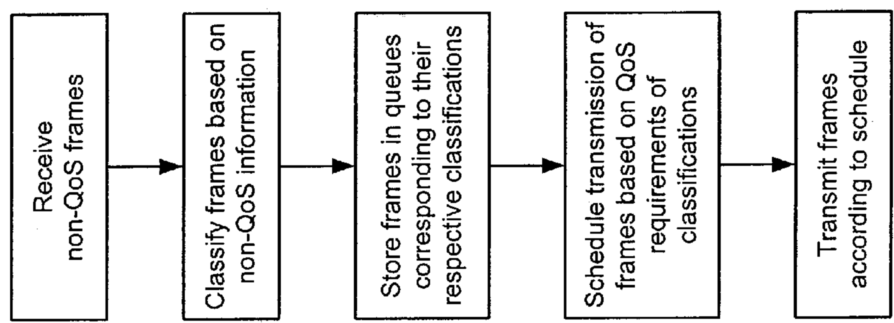
FIG. 1 is a flow diagram illustrating a method in accordance with one embodiment of the invention.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF PREFERRED EMBODIMENTS

One or more preferred embodiments of the invention are described below. It should be noted that these and any other embodiments described below are exemplary and are intended to be illustrative of the invention rather than limiting.

Broadly speaking, the invention comprises systems and methods for providing fractional bandwidth communication channels in classes of service that do not normally support these types of channels. It should be noted that, while the specific embodiments described herein are implemented in the context of Fibre Channel Class 2 and Class 3 systems, the systems and methods disclosed herein are applicable to many different environments, and should be construed to include embodiments that are implemented in non-Fibre Channel environments.

In one embodiment, a method implemented in a Fibre Channel Class 2 or Class 3 fabric comprises classifying the Class 2 or Class 3 (non-QoS) frames using information in existing headers, queueing the classified frames and scheduling the delivery of the queued frames to meet the bandwidth and latency requirements of particular virtual connections between devices. This method is illustrated in the flow diagram of FIG. 1.

In this embodiment, the method is implemented in a switched fabric topology. The switched fabric may be configured to provide either Fibre Channel Class 2 or Fibre Channel Class 3 service. The switched fabric includes one or more switches that are designed to operate in accordance with the present methodologies. When frames are received by each of these switches, the frames are first classified so that the frames which are to be handled with a particular quality of service are segregated. The frames are classified based on information that is present in headers that are normally used in conjunction with Class 2 or Class 3 service. For example, the classification may be based on the source and destination device identifiers, and/or any other information in the frame headers.

In this embodiment, when each frame is classified, it is forwarded to a queue to await transmission. Each queue contains frames corresponding to a particular communication channel. The frames are removed from the queue and transmitted over the corresponding communication channel in such a way as to provide the minimum bandwidth and maximum latency required for the quality of service associated with the channel.

The frames are removed from the queues and transmitted as determined by a scheduling algorithm. In this embodiment, the scheduling algorithm comprises a modified bin-filling algorithm. In this algorithm, the total available bandwidth is partitioned into a total number of bins. Bins are slots of time equal to the time it takes to send one maximum size Fibre Channel frame. The reserved bandwidth for a particular virtual connection is equivalent to a certain portion of the total number of bins. The bins that are allocated to virtual connections are filled first with frames corresponding to the respective virtual connections. After all virtual circuits have been satisfied, the remaining space in the bins is filled with any other frames that are available for forwarding. The scheduling algorithm is thereby able to achieve 100 percent utilization of the available bandwidth, even if the communication channels having reserved bandwidth do not use all of their allocated bandwidth.

One embodiment of the present invention is directed to a method or apparatus for implementing QoS features in a communication channel between a first device and a second device through at least one switch. This is achieved by allocating and operating fractional bandwidth circuits that satisfy requirements of minimum guaranteed bandwidth, maximum guaranteed latency, and guaranteed delivery of connectionless information frames between the first and second devices, which support and principally use the non-fractional Fibre Channel Classes of Service 2 or 3 to communicate.

One embodiment is further directed to a method or apparatus for deallocating fractional bandwidth circuits in a Fibre Channel system when they are no longer needed. This embodiment may further be configured to remove fractional bandwidth circuits when an error is detected.

One embodiment is further directed to a method or apparatus for making available bandwidth that is not allocated to fractional bandwidth circuits, i.e., the unused available bandwidth, available for use by non-fractional information frames in Fibre Channel Classes of Service 2 or 3 between a different pair of devices or device ports.

One embodiment relates to a method or apparatus for the switched fabric topology and the legacy devices coupled thereto, for allocating, operating, deallocating and removing fractional bandwidth circuits for non-fractional Classes of Service without altering the legacy devices. One embodiment relates to a method or apparatus to permit legacy devices that use the switched fabric topology and that implement either Class 2 or Class 3, or both, to receive the benefits of fractional bandwidth circuits without a redesign or replacement of the current legacy devices.

Further, one embodiment is directed to a method or apparatus that permits reducing the cost and complexity of a system while meeting the needs of these example applications and others.

Definitions

Before describing the preferred embodiment in detail, it may be helpful to review some of the terms used in relation to this embodiment. It should be noted that many of the definitions below are either derived from or copied from the NCITS T11 group's working draft standard proposed to the American National standard for Information Technology; Document titled "Fibre Channel; Framing and Signaling FC-FS Rev 1.70. Clauses and sections noted in the definitions may be found in that standard. Although the definitions below focus on the Fibre Channel embodiments described in detail herein, it should be noted, as explained above, that alternative embodiments need not be limited to Fibre Channel systems.

Arrival Time: The time a frame arrives into a given switch.

Bandwidth: The amount of data being sent over one side of a Fibre Channel Link in a fixed time period or the total capacity of the link to contain data. Typically measured in bytes per second (Bps) or Megabytes per second (MBps).

Classes of service: Type of frame delivery services used by the communicating Nx_Ports that may also be supported through a fabric. (See 4.8 and clause 13.)

Class 1 service: A service that establishes a dedicated connection between two communicating Nx_Ports. (See 4.8.2 and 13.2.)

Class 2 service: A service that multiplexes frames at frame boundaries to or from one or more Nx_Ports with acknowledgement provided. (See 4.8.3 and 13.3.)

Class 3 service: A service that multiplexes frames at frame boundaries to or from one or more Nx_Ports without acknowledgement. (See 4.8.4 and 13.4.)

Class 4 circuit: A pair of unidirectional Virtual Circuits between two communicating N_Ports. (see 25.3.5)

Class 4 service: A fabric service that establishes Virtual Circuits to provide fractional bandwidth service between communicating N_Ports. The fabric service multiplexes frames at frame boundaries using in-order delivery to or from one or more N_Ports with acknowledgment provided. (See 4.8.5, 13.6 and clause 25.)

Class Specific Control field: CS_CTL is an eight bit field containing a Virtual Circuit Identifier (VC_ID).

Credit: The maximum number of buffers allocated at a recipient to receive frames from a transmitting FC_Port. It represents the maximum number outstanding of frames that can be transmitted by an FC_Port without acknowledgement without causing a buffer overrun condition at the receiver. (See 18.3.)

Data frame: An FC-4 Device_Data frame, an FC-4 Video_Data frame, or a Link_Data frame. (See clause 11)

Destination_identifier (D_ID): The address identifier used to indicate the targeted destination Nx_Port of the transmitted frame. (see 9.4)

Destination Nx_Port: The Nx_Port to which a frame is targeted.

Earliest Deadline First: An algorithm that schedules events to occur in order of their proximity to a deadline. The most critical event is the one whose time is closest to expiring.

Exchange: The unit of protocol activity that transfers information between a specific Originator Nx_Port and specific Responder Nx_Port using one or more related non-concurrent Sequences which may flow in the same or opposite directions. The Exchange is identified by an OX_ID and a RX_ID. (see clause 17)

Expiry Time: The time by which a frame must be sent out of a switch in order to meet its latency requirement. It is computed as the time when a frame is considered to be eligible for forwarding plus its period. A frame is considered eligible for forwarding when it has actually arrived into the fabric input decision buffer, been properly classified, been queued with the proper tags for forwarding to the correct output buffer and a period of time has elapsed since the previous frame in this circuit has been marked as eligible for forwarding.

F_Port: The Link Control Facility (LCF) within the Fabric that attaches to an N_Port through a link. An F_Port is addressable by the N_Port attached to it, with a common well-known address identifier (hex 'FF FF FE'). See 9.4.

Fabric: The entity which interconnects Nx_Ports attached to it and is capable of routing frames by using only the D_ID information in a FC-2 frame header. (see 4.7.3)

Fabric_Name: A Name_Identifier associated with a Fabric. (See clause 14 and 15.5.4)

Fractional bandwidth: A portion of the total bandwidth available on a path. (see clause 25)

Fractional Circuit (FC): A unidirectional path between two communicating N_Ports through a fabric that permits Class 2, 3, and/or 4 service to be used. A Fractional Circuit is synonymous with Virtual Circuit. Two Fractional Circuits are required to form a Class 4 Circuit. (See 4.8.5 and 25.3.5.) The existence of a fractional or virtual circuit implies that the circuit has some guaranteed level of access to the available bandwidth of the Fibre Channel links forming an end-to-end circuit. Furthermore there may optionally be a latency guarantee associated with the fractional or virtual circuit.

Frame: An indivisible unit of information used by FC-2. (see 8.1)

Frame Time: The amount of time from when a frame starts leaving a port to when it finishes leaving a port. This could be thought of as the time domain length of a frame.

HBA: Equivalent to NIC and Nx_Port.

Latency: The amount of time a frame takes to traverse the network, plus the time the frame is available in the entry switch for forwarding but is waiting to be forwarded. This does not include the time when the frame might have been actually received by the entry switch but was not available in the respective queue to be forwarded.

Link: Two unidirectional fibers transmitting in opposite directions and their associated transmitters and receivers. A fiber may be a copper or optic strand of media.

Live Credit: This is the number of frames that a sender may send one after the other before having to wait for additional credit to send. Without live credit, if a sender is going to send frames at a rate of 100 frames per second, it could send 100 frames at once and then wait a second before sending more or it could send 10 frames every tenth of a second or it could send 1 frame every hundredth of a second. Live credit can be used to limit this.

Local Fx_Port: The Fx_Port to which an Nx_Port is directly attached by a link or an Arbitrated Loop (see remote Fx_Port).

L_Port: A port that contains Arbitrated Loop functions associated with Arbitrated Loop topology (See [7], FC-AL-2).

Name_identifier: A 64-bit identifier, with a 60-bit value preceded by a 4-bit Network_Address_Authority Identifier, used to identify entities in Fibre Channel (e.g. N_Port, node, F_Port, or Fabric.) (see clause 14).

Network_Address_Authority (NAA): An organization such as CCITT or IEEE that administers network addresses. (see clause 14)

Network_Address_Authority (NAA) identifier: A four-bit identifier defined to indicate a Network_Address_Authority (NAA) (see clause 14).

NIC: A Network Interface Card; this refers to the Port that serves as an interface for a Node to the Fibre Channel network. A NIC is equivalent to a Nx_Port.

NL_Port: An N_Port that contains the Loop Port State Machine defined in [7], FC-AL-2. It may be attached via a link to one or more NL_Ports and zero or more FL_Ports in an Arbitrated Loop topology. Without the qualifier "Public" or "Private," an NL_Port is assumed to be a Public NL_Port.

Node: A collection of one or more Nx_Ports controlled by a level above FC-2. (see 4.1)

Node_Name: A Name_Identifier associated with a node. (See clause 14 and 15.5.4)

Non-QoS: A system, method, etc. that does not have QoS (Quality of Service) characteristics. For example, a non-QoS frame is one that is not designed specifically to provide QoS or be used in a QoS system. A Fibre Channel Class 2 or Class 3 frame is a non-QoS frame and has non-QoS header information.

N_Port: A hardware entity that includes a LCF. It may act as an Originator, a Responder, or both. (see 4.1) Well-known addresses are also considered to be N_Ports (see 9.4.2).

N_Port_ID: A Fabric unique address identifier by which an N_Port is known. The identifier may be assigned by the fabric during the initialization procedure or by other procedures not defined in this standard. The identifier is used in the S_ID and D_ID fields of a frame. (see 9.4)

N_Port_Name: A Name_Identifier associated with an N_Port. (See clause 14 and 15.5.3)

Nx_Port: A port capable of operating as an N_Port or NL_Port, but not as an L_Port. (See [7], FC-AL-2.)

Originator: The logical function associated with an Nx_Port responsible for originating an Exchange.

Payload: Contents of the Data Field of a frame, excluding Optional Headers and fill bytes, if present (see table 12, and clause 8, clause 10, and 11.1.)

Period: The amount of time that if frames for a circuit are sent every "period" time they will exactly achieve their desired bandwidth.

Primitive Signal: A special Fibre Channel word consisting of four bytes. The first byte is always a K28.5 character which is a bit combination that is impossible to duplicate in valid data and which can easily be detected in hardware receiver logic. The three remaining bytes of the word are formed to indicate different primitive signals. Primitive signals are used in Fibre Channel to do in-band link level control functions like flow control.

QoS: Quality of Service. Providing QoS means providing QoS guarantees, such as minimum bandwidth or maximum latency in the delivery of frames.

R_RDY: A primitive signal that is used as a token for physical buffer-to-buffer flow control. A port utilizing Buffer-to-Buffer flow control may only originate a frame on the link if its BB_Credit (Buffer-to-Buffer credit) on the link is greater than zero. Once the frame is sent the BB_Credit count is decremented by one. A receiving port indicates a physical buffer is available by sending the R_RDY primitive signal.

Remote Fx_Port: The Fx_Port to which the other communicating Nx_Port is directly attached (see local Fx_Port).

Responder: The logical function in an Nx_Port responsible for supporting the Exchange initiated by the Originator in another Nx_Port.

Sequence: A set of one or more Data frames with a common Sequence_ID (SEQ_ID), transmitted unidirectionally from one Nx_Port to another Nx_Port with a corresponding response, if applicable, transmitted in response to each Data frame (see clause 17).

Sequence_ID (SEQ_ID): An eight bit field that contains a tag that all frames within that sequence of frames will carry showing that they are identified as part of the same sequence.

Sequence Initiator: The Nx_Port that initiates a Sequence and transmits Data frames to the destination Nx_Port (see clause 17).

Sequence Recipient: The Nx_Port which receives Data frames from the Sequence Initiator and, if applicable, transmits responses (i.e. Link_Control frames) to the Sequence Initiator (see clause 17).

Simple Network Management Protocol: A protocol for communicating simply structured management information. It is in wide use in versions 1 and 2. See [23], RFC 1157 for version 1 or [24], RFC 1901 for version 2.

Source_identifier (S_ID): The address identifier used to indicate the source Nx_Port of the transmitted frame.

Source Nx_Port: The Nx_Port from which a frame is transmitted.

TYPE: An eight bit field in the Fibre Channel frame header that indicates the upper level protocol or Basic Link service the frame belongs to.

Virtual Circuit (VC): A unidirectional path between two communicating N_Ports through a fabric that permits Class 2, 3, and/or 4 service to be used. A Fractional Circuit is synonymous with Virtual Circuit. Two Virtual Circuits are required to form a Class 4 Circuit. (See 4.8.5 and 25.3.5.)

Virtual Circuit Credit (VC_Credit): The number of receiver buffers allocated to a Virtual Circuit by an F_Port. It represents the maximum number of frames that an N_Port may transmit without causing a buffer overrun condition at the F_Port receiver. (See 13.6 and clause 25)

Virtual Circuit Identifier (VC_ID): An identifier associated with either the Originator (OVC_ID) or Responder (RVC_ID) for a Virtual Circuit. (see 9.5.2)

Virtual path: A fixed route through a Fabric in support of a Virtual Circuit.

Well-known addresses: A set of address identifiers defined in this standard to access global server functions. (e.g. a name server) (see 9.4).

Word: A string of four contiguous bytes occurring on boundaries that are zero modulo 4 from a specified reference.

Worldwide_Name: A Name_Identifier which is worldwide (globally) unique, and represented by a 64-bit value. (see clause 14)

Preferred Embodiments

Figure 2:
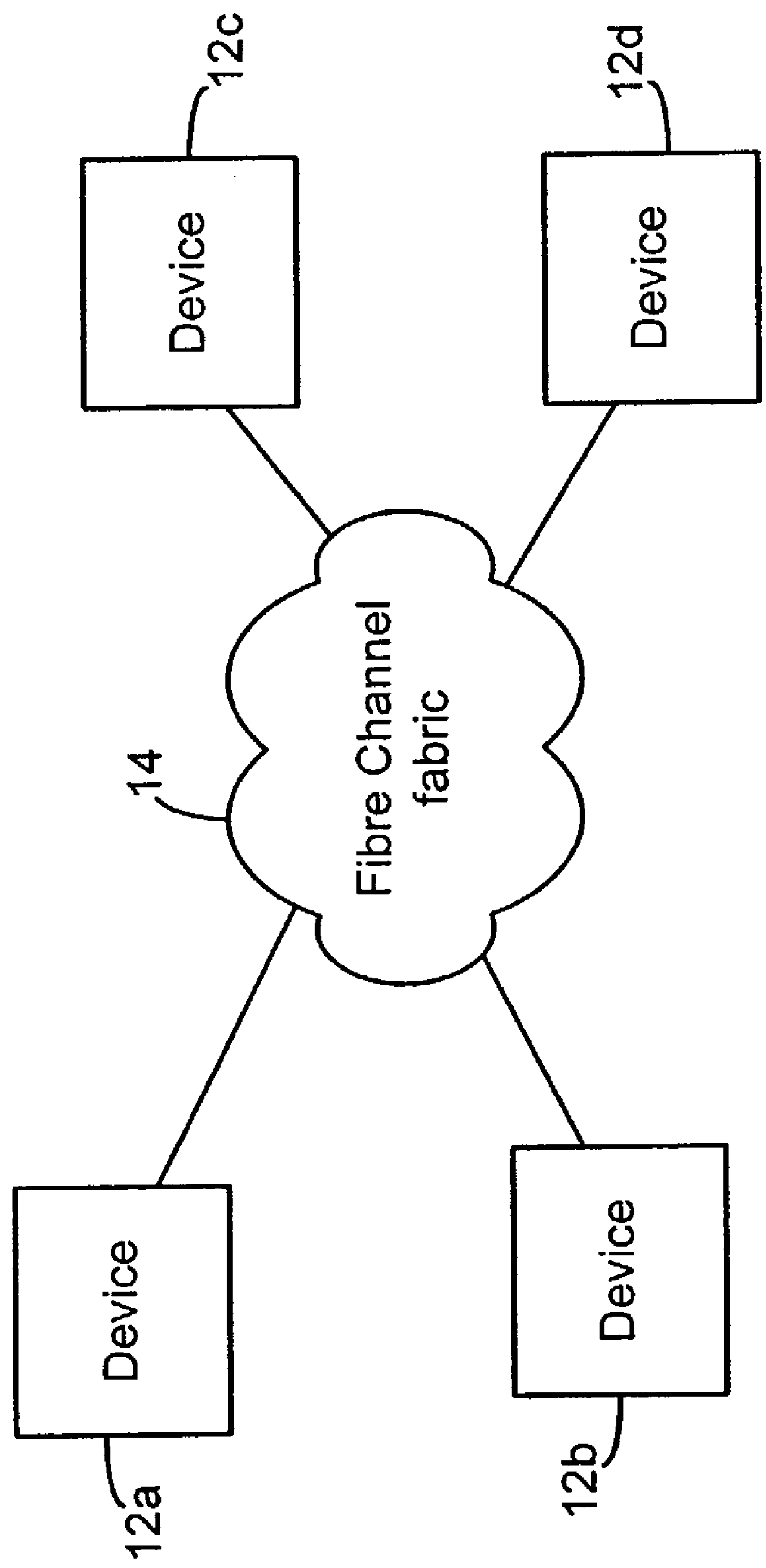
FIG. 2 is a diagram illustrating a storage area network (SAN) in accordance with one embodiment of the invention.

Referring to FIG. 2, a diagram illustrating a storage area network (SAN) is shown. The SAN comprises one or more devices 12 that serve as end nodes for transactions on the SAN. Each of devices 12 is connected to a switching fabric 14. In one embodiment, switching fabric 14 comprises a Fibre Channel fabric. The Fibre Channel fabric may comprise one or more Fibre Channel switches. The switches may be interconnected according to a variety of different topologies, and may form a plurality of paths for Fibre Channel frames to traverse the fabric from one device to another.

It should be noted that, for the purposes of this disclosure, identical items in the figures may be indicated by identical reference numerals followed by a lowercase letter, e.g., 12*a*, 12*b*, and so on. The items may be collectively referred to herein simply by the reference numeral.

Figure 3:
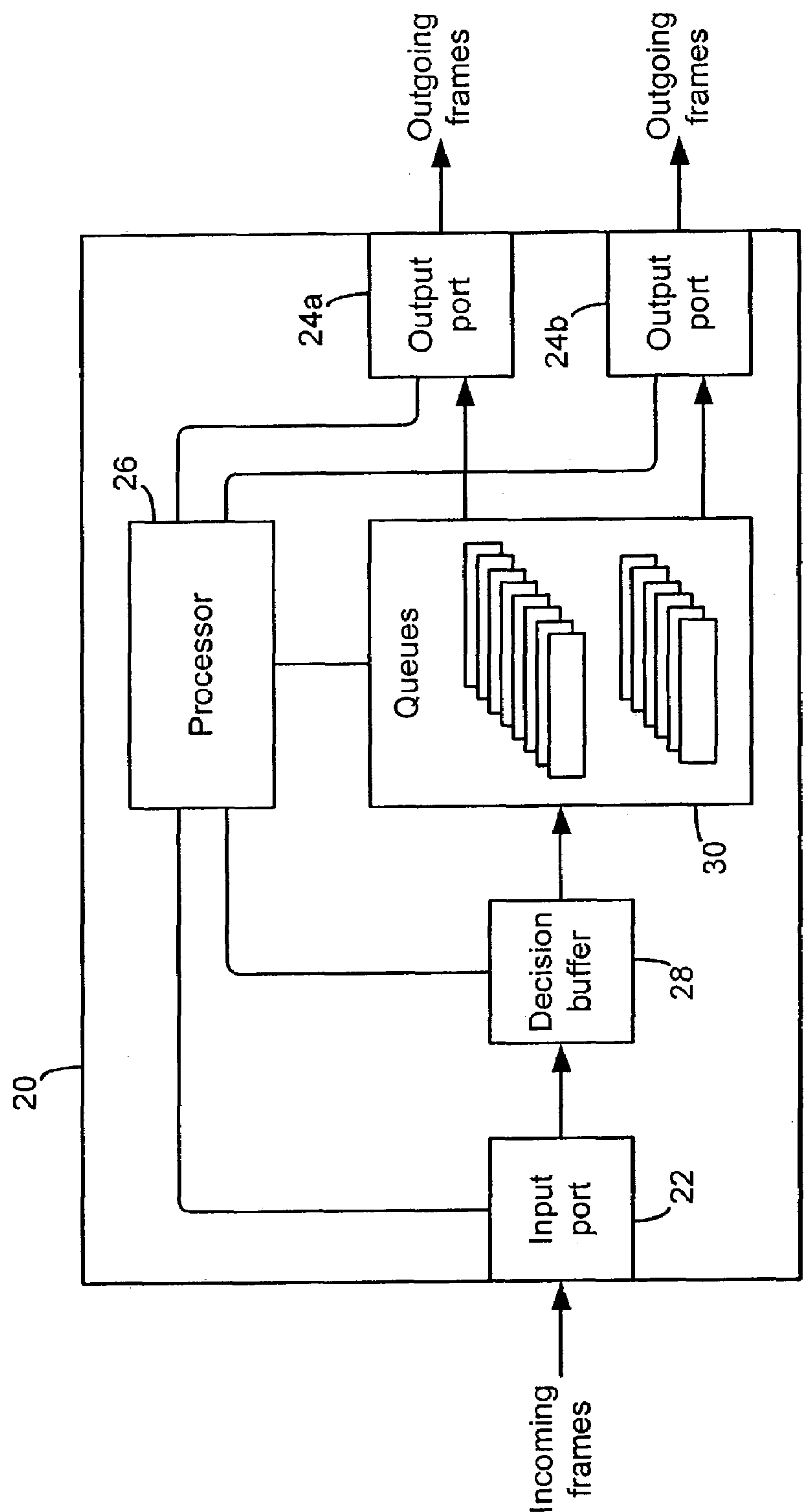
FIG. 3 is a functional block diagram illustrating the structure of an exemplary switch in accordance with one embodiment of the invention.

Referring to FIG. 3, a functional block diagram illustrating the structure of an exemplary switch in accordance with one embodiment of the invention is shown. In this embodiment, switch 20 comprises a Fibre Channel switch. Switch 20 includes an input port 22 through which Fibre Channel frames are received and a pair or output ports 24 from which frames are forwarded to other nodes (e.g., other switches or end-node devices). Switch 20 incorporates a processor 26 for controlling the routing of frames to the appropriate destinations. Processor 26 may include any type of data processing device, including a microprocessor, FPGA, ASIC or the like which is capable of performing the functions described herein.

Switch 20 also includes a decision buffer 28 and a set of dynamic queues 30. Frames that are received via input port 22 are forwarded to decision buffer 28. When the header information for the frame reaches decision buffer 28, processor 26 examines the header information. Based upon at least a portion of this information, processor 26 classifies the frame. The frame may be classified as being associated with a QoS circuit, or it may be classified as normal Fibre Channel Class 2 or Class 3 traffic. Based upon the classification, the frame is sent to an appropriate queue within the set of queues 30.

In one embodiment, queues 30 actually comprise a pool of buffer space. This buffer space is dynamically allocated to various queues as the space is needed. In fact, the queues themselves may be allocated and deallocated as needed. Each of the queues is associated a QoS circuit, except for one queue that handles the normal Class 2 or Class 3 frames. Each frame that is classified as traffic for a particular QoS circuit is forwarded to the queue corresponding to that QoS circuit. If a frame is not associated with a particular QoS circuit, it is forwarded to the queue for the normal Class 2 or Class 3 frames. Thus, all of the frames stored in a particular queue are associated with the same level of QoS (i.e., either the same QoS circuit or the same Class 2/3 service) and are scheduled for transmission in the same way.

Based upon the QoS requirements for a particular QoS circuit, processor 26 schedules the transmission of frames in the corresponding queue. If a QoS circuit is guaranteed N frames per second of bandwidth, processor 26 schedules at least N frames from the corresponding queue for transmission to the ext node in the respective transmission path. Frames in the queue associated with normal Class 2 or Class 3 service are scheduled for transmission as bandwidth is available. When a frame is scheduled to be transmitted, it is forwarded from its queue to the appropriate one of output ports 24.

The Fibre Channel Classes of Service described herein (i.e., Classes 1-4, 6 and F) are described in detail in several standards documents that are publicly available. Several of these documents are identified at the end of this disclosure and are incorporated herein by reference.

In a Fibre Channel environment, the communicating devices are called nodes, as contrasted with switches and hubs that couple nodes together. Fibre Channel provides a device-to-device, switched communication channel that permits multiple protocols through the same communication channel. Fibre Channel supports the prevalent network environment deployed today, as well as traditional I/O operations for storage devices. This makes it possible to use one communication channel in a device to support both traditional I/O protocols and network protocols at the same time.

Fibre Channel supports a number of different interconnect or coupling topologies, each defining the manner in which a set of devices may be coupled. These topologies include, for example, a direct one-to-one coupling between two devices (called point-to-point), a loop topology, and a switched fabric topology. A switched fabric provides for an arbitrary network of interconnected switches for coupling a plurality of devices without restriction as to the manner in which the switches can be arranged, and as to the manner in which the devices are coupled to the network.

While Fibre Channel has many strengths, it does, however, have some shortcomings. Fibre Channel supports six different Classes of Service for delivering, or attempting to deliver, information frames between communicating devices and/or switches, and through switches in a system. These Classes of Service include Classes 1-4, 6 and F, which will be described in more detail below. Neither these, nor any of the other Classes of Service for Fibre Channel provides a method or apparatus for fractional bandwidth circuits. There are, however, many applications that require Fibre Channel QoS behavior that cannot be altered or easily modified to meet these requirements. For example, storage backup, video and audio streams, and real time response or feedback systems require QoS guarantees in order to provide optimal performance. Today, the QoS requirements either are not met, or they are met by over-provisioning the system. Over-provisioning is used here to refer to the situation in which devices, ports and switches are dedicated to the system so that there is no congestion that would otherwise cause the information frame loss inherent in using a non-fractional Class of Service. The over-provisioning of the system is a "brute-force" method that is inefficient and expensive. While Fibre Channel Class 4 does provide means for QoS behavior, it does so only by using specially designed devices and switches. To implement Class 4, all legacy devices would have to be partially or completely redesigned to add the Class 4 service. As a result, Class 4 is not a viable option and has never been deployed.

Using the defined Fibre Channel classes of service, a typical prior art FC switch would receive a frame of data from a NIC and send it to the requested destination port with no concept of guaranteed bandwidth or latency. A FC switch is used to provide paths between NICs. Data is sent along these paths as sequences of frames. Within each frame is a header and payload data. The header provides routing information for the frame. This information includes S_ID, D_ID, CS_CTL, TYPE and SEQ_ID. Multiple frames make up a FC sequence and multiple sequences make up a FC Exchange. A NIC may have multiple exchanges and sequences active at any time, but will send frames to the switch one at a time. Flow control between a NIC and switch is controlled by link credit. A link credit of one means that the port can send one frame, a link credit of two means the port can send two frames. A single link credit is consumed when a frame is sent. Link credit is gained when a port receives a R_RDY primitive signal. A R_RDY primitive is sent when the switch has sent the frame to a destination port, or a NIC has consumed the frame, hence freeing up an input buffer.

Thus, in normal class 2 and class 3 service, the Fibre Channel frames are simply sent from the NIC to the Fibre Channel switch one at a time, with each frame being routed by the switch as it is received. Each of the frames is handled in the same manner. In the present systems and methods, however, the frames may be handled differently, depending upon the communication channel over which they will be sent and whether QoS features are provided in that channel. The QoS features are provided through the present switching methodology, which may be broken down into three fundamental components: (1) frame classification; (2) frame queuing; and (3) frame scheduling, each of will be discussed in turn below.

Frame Classification

In one embodiment, all switches perform frame classification. Typical prior art Fibre Channel switches examine the frame header to pull off the destination address of the frame and then perform a table lookup (in a routing table) to determine where to route the frame. In the present systems and methods, the destination address for the frame is still determined, but the frame is classified as well. More specifically, in one embodiment, the frame is classified as a QoS frame or not. If it is a QoS frame, the classification stage must determine with which QoS fractional circuit the frame is associated. The classification is based on examination of the contents of the frame and lookup in a classification table. All non-QoS frames are classified as a single group and queued together.

In one embodiment, the source_id (S_ID) and the destination_id (D_ID) are used for the classification of QoS frames. These two fields were chosen in this embodiment because, since these fields are located in the first two words of the header of the frame, the classification process still allows cut-through routing, versus store and forward routing. Further, using these two fields allows a virtually unlimited number of fractional circuits ($2^{24}$) per input port. Still further, using these two fields requires no modification of the frame by the source or destination node/device, as compared to the frames used for standard class 2 or class 3 service. In this embodiment, however, the classification table used to compare S_ID-D_ID pairs and to thereby classify the frames must be set up prior to the arrival of the first QoS frame.

The classification of frames begins with the arrival of the frames on an input link and storage of the frames in a decision buffer. After at least a portion of a frame (i.e., the header) is stored in the decision buffer, this portion of the frame can be examined to identify information that is used to classify the frame. Based upon the identified information (e.g., S_ID and D_ID), a routing decision is made and the frame is routed to the appropriate transmitting buffer, or queue. The routing decision may be made before the entire frame has actually entered the decision buffer. This is called cut-through routing.

In one embodiment, the switch uses the routing protocol defined in the Fibre Channel Standards (FSPF or Fabric Shortest Path First). To support packet switching (e.g., Fibre Channel Class 2 and Class 3), frames must be routed according to the destination identifier (D_ID) of the packet or frame. For the standard frame layout see FIG. 4. For the exploded view of the frame header see FIG. 5. Typical for Fibre Channel switches is "domain" routing. "Domain" refers to the most significant byte of the 24 bit native Fibre Channel address that comprises the D_ID of the frame. During system setup, each fabric domain controller takes one domain address.

Figure 4:
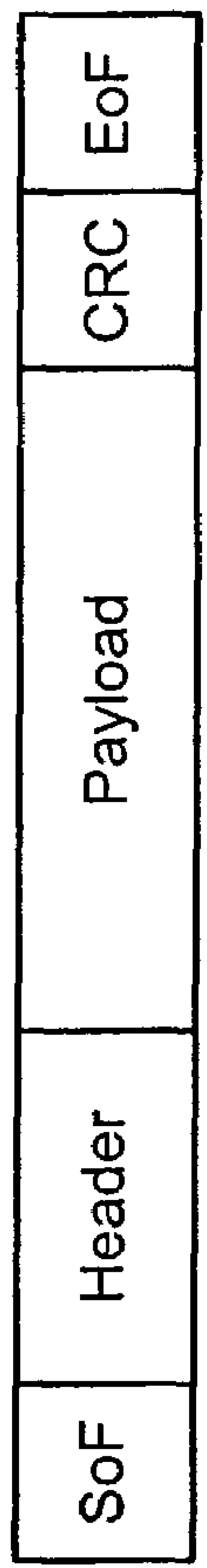
FIG. 4 is a diagram illustrating the standard frame layout of a Fibre Channel frame.

Referring to FIG. 4, the Start-of-Frame (SoF) delimiter is a specially encoded 10 bit byte character otherwise known as an Ordered Set that uniquely identifies the start of frames. Each class of service in Fibre Channel has its own special SoF delimiter. This is how fabric switches and ports know when frames are arriving. For example there is a SoF1, SoF2, SoF3, SoF4, and SoFf for the different classes of service. The End-of-Frame (EoF) delimiter is a specially encoded 10 bit byte character generically known as an Ordered Set that uniquely identifies the end of a frame. Unlike the SoF the EoF does not indicate a Fibre Channel class of service. The header is 24 bytes and contains numerous fields used for frame routing and for controlling the exchange of data between two ports. The payload field contains the data that is being sent or received. The payload may be any size from zero bytes up to and including 2112 bytes. The Cyclic Redundancy Check is a four byte field that is used to check the integrity of the presiding frame.

In one embodiment, the S_ID of the frame is used in addition to the D_ID to classify the frame. Any of the fields of the Fibre Channel frame header could be used and the frame still be cut-through routed. See FIG. 5. In one embodiment, S_ID, D_ID, CS_CTL, and TYPE fields are used to classify and route frames.

In Fibre Channel, alias addresses are allowed to be assigned to a port. Additionally, there is a definition for virtual N_Ports that allows a single physical N_Port to have any number of virtual N_Port address assignments from the fabric. The effect is to allow specific applications behind an N_Port to hold unique 24 bit native Fibre Channel addresses as their associated Fibre Channel N_Port's S_ID. Therefore, performing frame classification based on both the S_ID and the D_ID allows individual applications to reserve fractional bandwidth circuits. The other fields allow various levels of groupings of applications for more robust and varied frame classification. Any of these fields can be used for the purpose of frame classification as disclosed herein.

Embodiments of the present invention use header fields (typically other than the D_ID field) during frame classification for the purpose of establishing and enabling end-to-end QoS connections. This may provide distinct advantages over the prior art. It is also distinct from methods documented in the prior art such as Fibre Channel Class 4 methods, which include no frame classification but simply perform normal examination of D_ID for routing decisions. Frames are classified in Class 4 by the presence of a Special Ordered Set for Start-of-Frame Class 4 (SOF4). This Class 4 SOF delimiter precedes the frame and is uniquely coded so that logic may be triggered on the recognition of the appropriate bit pattern that a QoS Class 4 frame has arrived. Further classification in Class 4 is completed by the use of the CS_CTL field where the specific Fractional circuit is identified. The use of the SOF ordered set for Class 4 and the use of CS_CTL are unique to Class 4 and are not used by any Class 2 or Class 3 only compliant devices in Fibre Channel.

Thus, embodiments of the present invention allow standard Class 2 and Class 3 devices to classify frames by utilizing the header fields that Class 2 and Class 3 use in normal operation. No changes to standard end devices or N_Ports are required to support QoS features. Within Fibre Channel Class 2 and Class 3, the only frame header field conventionally used for routing or scheduling purposes is the D_ID field. The use of the other fields of the Fibre Channel Header for routing and/or scheduling to affect a QoS service is unique to embodiments of the present invention.

Frame Queuing

After the frame is classified, it is stored in an appropriate transmitting buffer (queue). As noted above, the switch may support any number of simultaneous QoS fractional circuits per input port. Each QoS fractional circuit has an associated queue to hold frames awaiting scheduling for forwarding through the designated output port. The structure and operation of the queue may vary from one embodiment to another. In one embodiment, the queues at each input port are very deep in order to allow a device to blast sequences of frames that may be quite large. These deep buffers serve the purpose of alleviating head-of-sequence blocking at a standard Fibre Channel class 2 or class 3 NIC card.

Buffer space for queues can be very expensive, particularly when memory for the queues is included in the design of an ASIC. The ASIC's valuable gates are consumed by the queues and the cost of the queues increases with their size. Traditionally, system designers have minimized the number and size of buffers in their designs. In order to effectively guarantee fractional bandwidth circuits, however, buffers are a necessity. In fact, in one embodiment of the present invention, there are reasons for the use of large or "deep" buffers to improve the end-to-end QoS capability of the system.

Head of queue blocking occurs when a sequence of data to be sent from a port is blocked because there is a sequence in front of it in the queue that must go first. To reduce cost, manufacturers of Fibre Channel N_Ports have conventionally only included one transmit queue in their designs. These devices are then limited by their ability to transmit only one sequence of data at a time. Once a sequence of data starts, it must finish before a subsequent sequence can be transmitted. Therefore, if the currently active sequence is blocked by credit to its destination, no other sequence can be sent by the port until the currently active sequence eventually finishes or times out as an error in transmission.

Figure 6:
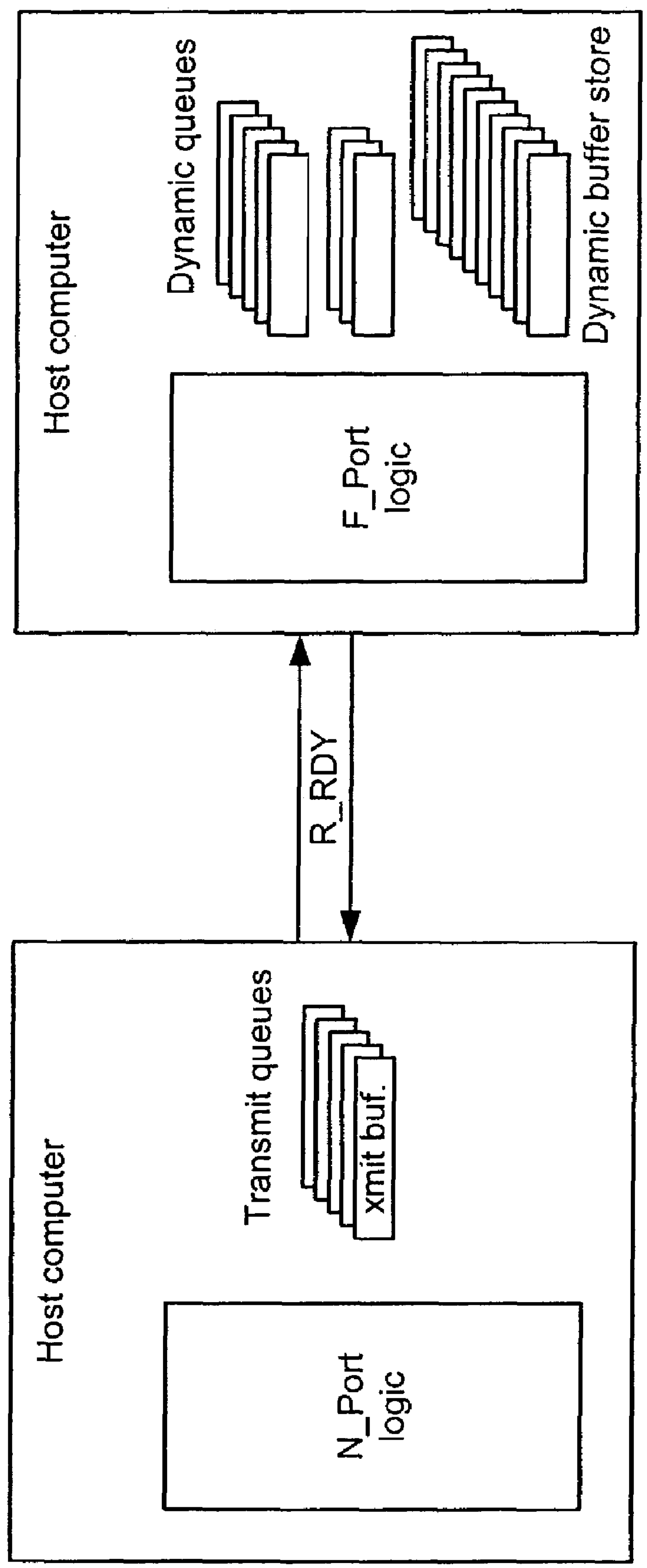
FIG. 6 is a diagram illustrating a host computer having a single transmit queue communicating with a switch F Port having a plurality of dynamically allocated queues.

Referring to FIG. 6, an exemplary host computer only has one transmit buffer. This buffer is organized as a first-in-first-out queue. To alleviate the head of Queue blocking problem with standard Class 2 and Class 3 devices, one embodiment of the present invention provides very deep buffers at the F_Port of the switch. The deep buffers of the switch are actually dynamically allocated from a very large buffer store. In one embodiment, this is achieved by implementing the queues as linked lists. Once frames are classified by the switch as being associated with a particular fractional circuit, buffer space is allocated from the buffer store to the appropriate dynamic queue (which is associated with the fractional circuit). The flow control back to the Host Computer is standard Class 2 and Class 3 R_RDY-based buffer-to-buffer credit (BB_Credit) management. The flow control word (R_RDY) has no identifying information associated with it to signal the buffer that is to be used on the Host Computer.

It is assumed that the host computer is managing its own buffers as a single queue. Therefore, the host computer is given a large amount of BB_Credit. The amount of credit is larger than some multiple of the largest sequences likely to be sent by the host computer. This allows the host computer to blast the sequences over to the switch F_Port at the line rate. Frames fill the available buffers in the F_Port at line rate until the buffers are used. However, from the moment the first frame enters a Switch_F_Port buffer it is scheduled out at the line rate that matches its expected bandwidth guarantee. As a result, no one sequence should get stuck or blocked, and no subsequent sequence should be held back. This essentially results in a leaky bucket technique to solve the head of queue blocking problem.

It should be noted that, in addition to the alleviation of the head of queue blocking problem, the dynamically allocated queues provide more efficient use of buffer space than statically allocated queues and supports the use of fractional circuits. As noted above, the present switch may support any number of simultaneous QoS fractional circuits per input port. The buffer space may be allocated to as many, or as few, fractional circuits as may be needed from time to time. Deep buffers also allow two ports (e.g., an N_Port and an F_Port, or two F_Ports) which are connected together to be separated by long distances and yet still achieve maximum line rate data efficiency.

The deep buffers and dynamically allocated queues of the present switch are distinct from the mechanisms of the prior art. For instance, devices such as host computers that are operable with Class 4 are expected to have multiple transmit queues, rather than the single queue used with Class 2 and Class 3-operable devices. Each one of the multiple Class 4 transmit queues may be dedicated to specific fractional circuits. The Class 4 switch F_Port actually pulls frames from the N_Port in the Class 4 host computer by issuing a flow control word identifying the fractional circuit and, by association, the buffer from which to pull the frame. The switch F_Port controls the number of frames that are pulled from each set of buffers, and also controls the rate at which the frames are pulled, thereby controlling the bandwidth and latency of the frames for each circuit. It should be noted that there is to date no known actual implementation of Fibre Channel Class 4 switches or devices.

Frame Scheduling

After each frame is queued, it is scheduled for transmission from the appropriate output port of the switch and through the switching fabric. In one embodiment, each QoS fractional circuit is scheduled independently of the others. Further, each QoS fractional circuit has an associated timer that determines when a frame is ready to come off the queue and be forwarded.

After the frames are classified and queued, they are scheduled from the proper queues to enable delivery of the frames with the guaranteed bandwidths (QoS). There are many methods for scheduling that may work. In one embodiment, a modified bin-filling algorithm is used.

In accordance with this algorithm, every bandwidth reservation is assumed to be filled by the user by sending full-length frames. In the case of Fibre Channel, a full-length frame comprises 2 Kbytes of data. If 1 Megabyte per second is the guaranteed bandwidth, 500 2 KByte packets are guaranteed every second. The bandwidth reservation also implies a window within which a minimum set of packets must be sent. For instance, in this 1 Megabyte per second fractional circuit, frames must be sent at a 2 millisecond rate in order to stay current with the overall bandwidth rate. The 2 millisecond rate window is computed by dividing the number of packets into 1 second (1/500=0.002 seconds). This algorithm takes the least common denominator of all the requested bandwidth reservations and comes up with a common rate window during which a number of frames must be sent for each circuit.

As an example, if it is assumed that there is a 2 Megabyte circuit in addition to the 1 Megabyte circuit, the least common denominator of the requested bandwidth rates is 1/500, or 2 milliseconds. The rate window is therefore 2 milliseconds. Accordingly, the 1 Megabyte per second circuit will have one frame scheduled per rate window, and the 2 megabyte per second circuit will have 2 frames scheduled per rate window. The rate window of 2 milliseconds will have approximately 20 frame times. Consequently, three of the frames that can be sent during the rate window are reserved for the queues corresponding to the fractional circuits (guaranteeing bandwidths of 1 and 2 megabytes per second, respectively). The other 17 frame times are used to dynamically schedule all other available frames.

It should be noted that, in this embodiment, frames may be arriving at line rate from the end node to the switch and may be arriving much faster than the anticipated and needed rate window rate. At the switch, the deep buffer does not count the frames to have arrived for scheduling purposes until the corresponding rate window has started. As a result, if the rate window for a circuit supports 2 frames per rate window but there are 8 frames in the queue, those frames will be held until the proper rate window starts. It would therefore take four rate windows to send all eight frames.

In one embodiment, a repeating timer is associated with each queue. The timer has a period corresponding to the frame rate for the queue's bandwidth allocation. When the timer expires, if there are frames in the queue that have not been marked as available for forwarding (i.e., its rate window has not started), the first unmarked frame is marked as available for forwarding, indicating that the frame's rate window has opened.

In one embodiment, each frame also has an associated expiry time. When a frame is classified as being associated with a specific virtual circuit, and the window in which the frame is to be forwarded has arrived, a clock time is associated with the frame. This is the expiry time. The expiry time is the time the frame needs to have been forwarded in order to meet its QoS circuit (latency or bandwidth) requirements. In this embodiment, the bin filling algorithm examines all the queues for a specific destination and looks for frames marked as available to forward. If multiple queues corresponding to multiple circuits have frames which are ready to forward to the same destination, the bin filling algorithm selects the one with the nearest expiry time first. In this manner, the expiry time is used to prioritize handling of frames.

In regard to flow control, frames are sent from a queue in this embodiment based on the bin filling algorithm used and buffer space available at the destination. The amount of buffer space available at the destination is discovered and tracked by use of a flow control token. There is a separate token for every possible fractional circuit. In this way, a fractional circuit should never be blocked for credit because of the poor performance of another circuit.

The classification, queueing and scheduling described above enable the hop-to-hop handling of the frames in a manner that allows quality of service guarantees to be provided. In other words, they describe the functionality of the switches used to provide QoS to Fibre Channel class 2 and class 3 devices. It is also important to address the end-to-end characteristics of the system in relation to providing QoS guarantees (e.g., minimum bandwidth and maximum latency). Incorporating the building blocks of frame classification, frame queuing, and frame scheduling into the fundamental design of the switch enables an end-to-end protocol and service for user applications.

Circuit Setup/Teardown

The user needs to have an end-to-end circuit set up before the circuit becomes useful to him or her. The utility of the circuit is limited by bottlenecks that are present, even if most of the circuit is operating ideally. The present systems and methods provide a means to determine whether QoS requirements can be met at every hop before fractional circuits are allocated and QoS guarantees are made.

In one embodiment, the present circuit setup relies on the FSPF database for its understanding of all network elements (switches) and then maintains its own QoS database. Every QoS-enabled switch maintains an identical copy of this database for all the QoS circuits in the fabric. A circuit setup request therefore goes to all QoS-enabled switches. Every switch along the path must authenticate the message and its ability to handle the reservation. If a switch in the FSPF path cannot handle the bandwidth reservation, then the switch will automatically investigate all alternative routes to find one that can support the bandwidth reservation.

A request to set up a circuit can come from any switch element in the fabric. This request is broadcast to all of the switch elements. Each switch then determines whether it is in the best path, and whether it has the resources to set up the circuit. If the switch elements in the best path can handle the circuit, the circuit is set up. If the switch elements in the best path cannot handle the circuit, alternative routes are selected and the corresponding switch elements again determine whether they can support the proposed circuit. If the circuit can be handled, it is set up and notification of the new circuit is broadcast to all of the switches. It should be noted that this same type of adaptation of the circuit routing can be used to adapt existing circuits in the event that congestion, device failure or other conditions prevent the existing circuit from meeting its QoS requirements.

Switches that are not QoS-enabled are not sent the request and are not considered active participants. A switch that does not actively participate in QoS may still be in the QoS path, however, if all the data paths into that switch are in fact controlled by QoS-enabled switches. The QoS-enabled switches ensure that the non-QoS-enabled switch is not overly taxed. It is therefore possible to provide QoS in a heterogeneous environment (i.e., an environment in which not all of the switching elements support QoS). In the same manner, a few elements configured in accordance with the present disclosure may provide a policing function for data traffic, so that portions of a network or switching fabric are not overburdened.

The advantages of the present systems and methods are apparent in comparison to prior art systems, none of which matches the present end-to-end QoS capabilities. Consider, for example, Ethernet. Ethernet uses a reservation protocol called RSVP to discover end-to-end behavior in support of QoS at every hop. RSVP relies on two signaling frames: PATH; and RSVP. PATH commands are sent from the source along the shortest path first route which is currently established. At each hop, the current network switch element/port can add and/or modify the PATH message to include its lowest common denominator support for QoS scheduling and handling. The destination sends back RSVP messages that indicate to the source what the best QoS handling available along the path actually is.

Figure 7:
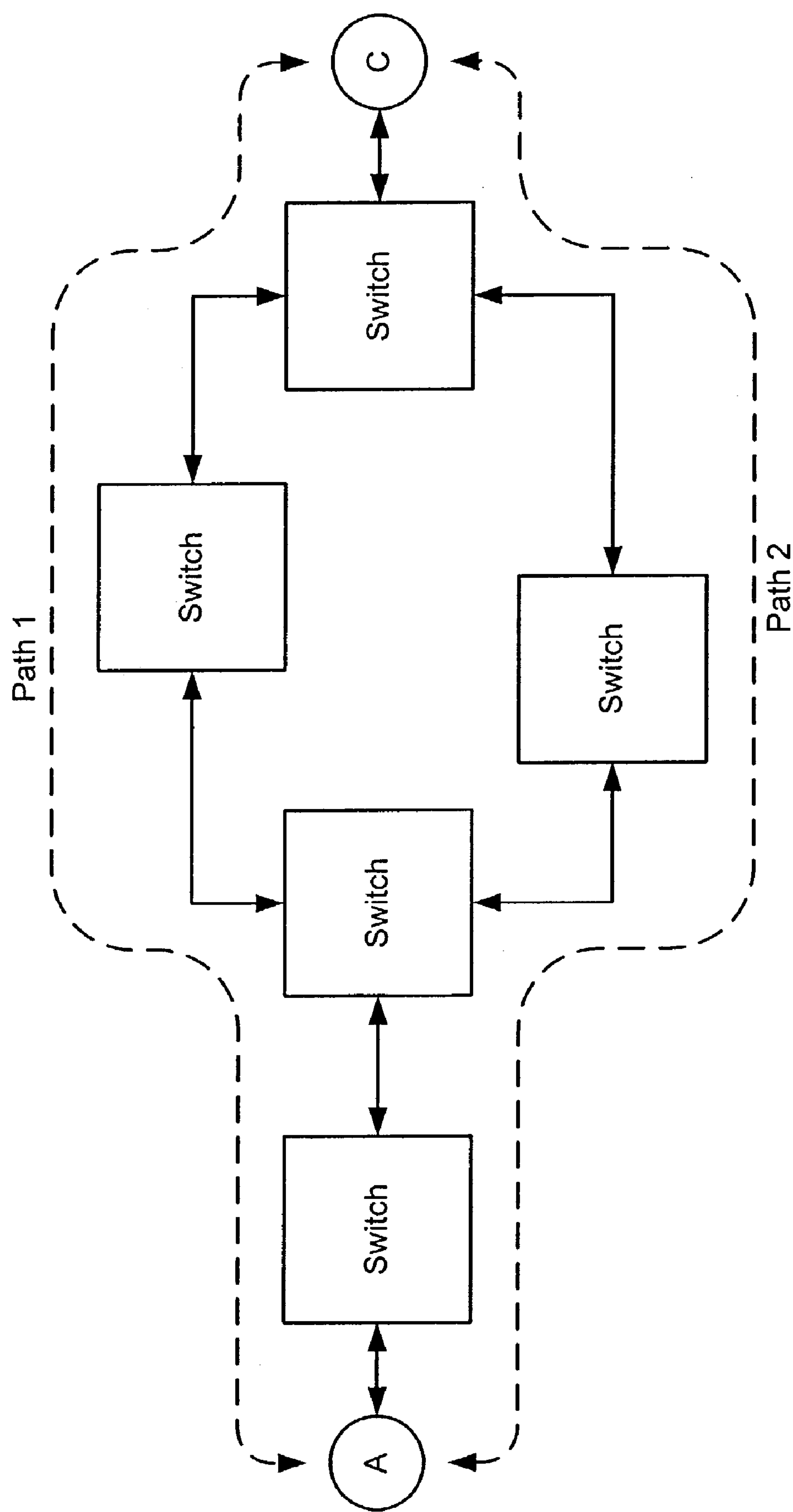
FIG. 7 is a diagram illustrating a plurality of paths through a switching fabric between a first device, A, to a second device, C.

There are a number of significant problems with the Ethernet approach. First, RSVP assumes that the backward path is exactly the same as the forward path. This assumption is not correct for Fibre Channel. Consider FIG. 7. Whereas both Fibre Channel FSPF (Fabric Shortest Path First) and RSVP assume that only one path will exist as the shortest path at a given time between two endpoints (e.g., node A and node C), RSVP and the Ethernet shortest path first algorithms further assume that the same path will exist in the reverse direction from node C to node A. In Fibre Channel, however, if a second path has the same cost associated with it as the first path, it is very possible for frames to transit the first path from node A to node C, and to transit the second path from node C to node A. Such occurrences are common in Fibre Channel because it is common practice to have more than one connection and path to a critical server.

Another problem is that, in order for RSVP to work properly, the entire switch fabric must be able to understand RSVP. In other words, the fabric must be homogeneous with regard to QoS in implementation of an end-to-end protocol, even if not in ability to actually handle frames equally across the network.

Another difference between the NGS circuit setup and RSVP is that the developers of RSVP choose to make it independent of the routing protocol. This is accomplished by not relying on any of the configuration data that the routing protocol gathers to automatically determine the network configuration. In one embodiment of the present invention, the switches make full use of FSPF and the database of information that has been gathered during network initialization. The result is that the present switches know what other network elements are in place and to whom they belong. As a result, when a port of the present switch desires to set up a guaranteed fractional circuit, it sends the setup command only to those switch ports that will understand the command and it sends the command directly to those ports that understand.

There may be a number of reasons for breaking down a circuit. These reasons may include such things as a failure in one of the end devices (nodes), the inability of an end device to maintain the subscribed rate (short of a complete failure), or the passing of the need for the guaranteed bandwidth (e.g., when a restore operation completes).

One of the problems that may arise in tearing down a circuit is that frames for the circuit may still be in process along the path while it is being dismantled. If a guaranteed fractional circuit is dismantled, the frames between the two end devices for the circuit are handled using standard non-fractional service (e.g., Fibre Channel Class 2 and Class 3). This normally comprises best effort delivery using available bandwidth.

In one embodiment of the present invention, the QoS circuit is torn down by closing the circuit on the switch closest to the source first. In other words, the switch is notified that the circuit is being closed. The circuit is then closed for the next switch in the path, then the next, and so on, until the exit switch is reached. All QoS enabled switches in the fabric are also notified of the circuit breakdown so that their QoS databases can be updated.

It should be noted that, in one embodiment, when the circuit is to be closed at a switch, the frames in the queue for the circuit must first be cleaned up. This is done by stopping classification of frames into the queue for the circuit, then waiting for the frames in the queue to be retrieved and forwarded. When the queue is empty, the circuit can be closed. This is repeated for each successive switch in the circuit. In this manner, all of the frames that are accepted in the circuit are delivered before the circuit is completely closed.

Advantages

A number of advantages over the prior art may be obtained by the various embodiments of the present invention. Some of these advantages have already been discussed above. For example, one or more embodiments provide QoS features to non-QoS devices. In one embodiment, legacy Fibre Channel Class 2 and Class 3 devices can be provided with circuits that have associated latency and bandwidth guarantees by implementing the present systems and methods in a Fibre Channel switching fabric. Classification of frames (and defining of QoS circuits) is based on non-QoS information (e.g., S_ID, D_ID) in standard frame headers. No special frame delimiters or headers are necessary, and no modification of the devices themselves is necessary to achieve the latency and bandwidth guarantees, which are significant advantages over Fibre Channel Class 4 service.

Another advantage of some embodiments is the use of deep buffers to receive frames. Since a large amount of buffer space is provided in these embodiments, the corresponding switches do not have to delay receipt of additional frames simply because one or more received frames have not yet been processed (classified) and forwarded to appropriate queues. Instead, the switches can buffer a large number of frames (e.g., burst traffic) without delaying them and then allow the frames to be processed more slowly. Head-of-queue blocking is thereby avoided.

Another advantage of some embodiments is the use of dynamically allocated queues to hold the classified frames. As discussed above, the queues can be allocated from a pool of buffer space. Queues can be allocated when a corresponding QoS circuit is set up, and deallocated when the circuit is torn down. As frames are received and classified, queues for the corresponding classifications can be lengthened to accommodate the additional frames. This is done in one embodiment by implementing the queues as linked lists. As new frames are added to the queues, corresponding storage locations are added to the linked lists. The dynamic allocation of the queues provides much more efficient usage of the buffer space than statically allocated queues.

A significant advantage that may be provided by embodiments of this invention is the support of heterogeneous switching environments. According to the present disclosure, QoS may be provided in environments where not all the switches present support any method of providing QoS. By comparison, Fibre Channel Class 4 (which has not even been implemented) requires that all switch ports in the entire Fibre Channel fabric support Class 4. Otherwise, no port can use it. Ethernet QoS techniques (Differential Services, Integrated Services and MPLS, or Multi-Protocol Label Switching) require an end-to-end setup protocol called RSVP to check every hop along the forwarding path for QoS consistency. RSVP, however, assumes that the return routing path for a circuit will be the same as the forward routing path, which is not true in Fibre Channel. RSVP is also completely separate from the network routing protocols that may be used. This means that RSVP gets no information from the network routing database. The present systems and methods acknowledge that return paths are not necessarily the same as forwarding paths and make use of the Fibre Channel network database for additional routing information. The end result is that the present systems and methods do not require a homogeneous network capability to offer guaranteed fractional bandwidth services. In other words, not all of the switches must provide the same QoS capabilities. The present systems and methods may therefore be implemented in a heterogeneous network environment.

Another advantage that may be provided by embodiments of the present systems and methods relates to bandwidth allocation. In prior art systems and methods, bandwidth which is allocated to a circuit but not used is lost. In the present systems and methods, unused bandwidth on a link is dynamically and instantaneously available for other traffic. The unused bandwidth may simply be unallocated bandwidth, or it may be allocated to devices that are not fully utilizing the bandwidth. Either way, the unused portion of bandwidth may be used by the same two devices or other devices to transmit and receive data (e.g., standard Class 2 and Class 3 frames). Guaranteed bandwidth allocations may be modified in real-time, thereby allowing circuits to be managed in a dynamic environment. For instance, it may be the policy of a network administrator that, when a restore operation takes place, all applications except the restore operation have their bandwidth allocations temporarily reduced while the restore operation's bandwidth is correspondingly increased. Once the restore operation completes, the pre-restore bandwidth allocations may be returned to their original levels.

Yet another advantage that may be provided by embodiments of this invention is that it allows for switches to route QoS frames utilizing cut-through routing techniques. This can be accomplished for QoS frames allocated to fractional circuits at full bandwidth utilization. In prior art technologies such as Ethernet, attempts to provide QoS result in store and forward routing that adds significantly to the latency of the routed frames.

Body of Work Available in the Application Space

As noted above, there are several applicable standards from the Fibre Channel set of standards that are identified below. These standards define Fibre Channel Classes 1-4, 6 and F. The identified Fibre Channel standards specify a variety of communication protocols, data rates and physical media interface types (e.g., optical, coaxial, twisted pair wires) for interconnecting and communicating between peripheral devices, network devices and switches, and computing devices that support multiple I/O and networking protocols.

The International Committee for Information Technology Standards (INCITS, formerly ANSI and NCITS) has adopted an interface standard for Fibre Channel, and is available in an INCITS standard document INFORMATION TECHNOLOGY—FIBRE CHANNEL PHYSICAL AND SIGNALLING INTERFACE (FC-PH), ANSI/NCITS X3.230-1994 (hereafter "FC-PH"), which is incorporated herein by reference.

An addendum to FC-PH has been adopted and is available as INCITS standard document ENTITLED ADDENDUM 1 TO ANSI/NCITS X3.230-1994, FIBRE CHANNEL PHYSICAL AND SIGNALLING INTERFACE (FC-PH), ANSI/NCITS X3.230-1994 Addendum 1:1996 (hereafter "FC-PH-2"), which is incorporated herein by reference.

An addendum to FC-PH has been adopted and is available as INCITS standard DOCUMENT ADDENDUM 2 TO ANSI/NCITS X3.230-1994, FIBRE CHANNEL PHYSICAL AND SIGNALLING INTERFACE (FC-PH), ANSI/NCITS X3.230-1994 Addendum 1:1996 (hereafter "FC-PH-2"), which is incorporated herein by reference.

A supplement to FC-PH has been adopted and is available as INCITS standard document ENTITLED FIBER CHANNEL 2ND GENERATION (FC-PH-2) (FORMERLY FC-EP), ANSI/NCITS X3.297-1997 (hereafter "FC-PH-2"), which is incorporated herein by reference.

A second supplement to FC-PH has been adopted and is available as INCITS standard document entitled THIRD GENERATION FIBRE CHANNEL PHYSICAL AND SIGNALING INTERFACE (FC-PH-3), ANSI/NCITS X3.303-1998 (hereafter "FC-PH-3"), which is incorporated herein by reference.

A separate standard in the set of Fibre Channel standards has been adopted and is available as INCITS standard document entitled FIBRE CHANNEL-FABRIC GENERIC REQUIREMENTS (FC-FG), ANSI/NCITS X3.289-1996 (hereafter "FC-FG"), which is incorporated herein by reference.

A modification and replacement for FC-SW-1 is in draft stage and is in the process of being adopted as INCITS standard document entitled INFORMATION TECHNOLOGY—FIBRE CHANNEL SWITCH FABRIC—2 (FC-SW-2), ANSI/NCITS 355-2001 (hereafter "FC-SW-2"), which is incorporated herein by reference.

Classes of Service Available

As pointed out above, Fibre Channel supports six different Classes of Service for delivering, or attempting to deliver, information frames between communicating devices and/or switches and through switches in a system (i.e., Classes of Service 1-4, 6 and F). The highlights of these classes of service are described below.

Class 1

Class 1 is a user class of service; meaning it is provided for processes running on host computers or end node devices, and is utilized to get information to and from other devices across the network. When the switched fabric topology is in use, Class of Service 1 establishes a dedicated connection between an at least one first device and an at least one second device through at least one switch. The fabric retains the dedicated connection. A dedicated connection consists of a first dedicated real circuit from the first device to the second device and a second dedicated real circuit from the second device to the first device. These two dedicated real circuits form a bi-directional path for information transfer between the first device and the second device. For Class 1, the first device and the second device are active participants in setting up the dedicated connection by requesting the dedicated connection of the switch(es) between them.

In Class 1, one hundred percent (100%) of the bandwidth is allocated and guaranteed in each of the two dedicated real circuits between the first and second devices. In addition, the maximum latency across the switched fabric is guaranteed, but unknown, between the first and second devices. One of the problems with one hundred percent (100%) dedicated real bandwidth in each dedicated real circuit is that the first and second devices, as well as the switches between them, seldom can sustain one hundred percent (100%) bandwidth information transfers to the other, even for short periods of time. The result is a loss of allocated bandwidth in the communication system, since the unused bandwidth in the dedicated connection cannot be reallocated to other devices. A problem with the unknown maximum latency across the switched fabric is that, although delivery of an information frame between the devices is guaranteed, neither the first device nor the second device can guarantee arrival of the information frame at the other device at or before a particular time after transmission.

Class 2

Class 2 is a user class of service. When the switched fabric topology is in use, Class of Service 2 is a connectionless service between a first device and a second device through at least one switch with the at least one switch multiplexing frames at frame boundaries across each at least one switch. The receiving device provides an acknowledgment (ACK) or busy (P_BSY) response to delivery of an information frame by sending an ACK or P_BSY information frame back to the sending device, or the switched fabric provides notification of failure to deliver an information frame by sending a fabric busy (F_BSY) information frame back to the sending device. For Class 2, no bandwidth (0%) is allocated or guaranteed to either the first device or the second device through at least one switch. There are no dedicated fractional circuits or dedicated virtual circuits between the first device and the second device through at least one switch. The path used across the switched fabric may change on frame boundaries. This means that no dedicated or virtual path exists between the first device and the second device and there is no minimum guaranteed bandwidth. In addition, for Class 2 there is no maximum guaranteed latency across the switched fabric. Class 2 operation is completely asynchronous and unbounded in parameters necessary for real time operations (e.g., video on demand).

Most switches on the market today support Class 2 although very view applications are utilizing it.

Class 3

When the switched fabric topology is in use, Class of Service 3 is also a connectionless service between a first device and a second device through at least one switch with the at least one switched multiplexing frames at frame boundaries across each at least one switch. The receiving device does not provide any acknowledgment or busy response to delivery of an information frame, and, also, the switched fabric does not provide notification of failure to deliver an information frame. This type of information transfer is called a datagram service in networks. For Class 3, like Class 2, no bandwidth (0%) is allocated or guaranteed to either the first device or the second device. There are no dedicated real circuits or dedicated virtual circuits between the first device and the second device through at least one switch. The path used across the switched fabric may change on frame boundaries. This means that no dedicated or virtual path exists between the first device and the second device and no minimum guaranteed bandwidth. In addition for Class 3, there is no maximum guaranteed latency by the switched fabric. Class 3 operation is completely asynchronous and unbounded in parameters necessary for real time operations (e.g., video on demand).

Class 3 is a user class of service and is the dominant class of service in use in the market place today.

Class 4

When the switched fabric topology is in use, Class of Service 4 establishes a virtual circuit connection between a first device and a second device through at least one switch; the fabric retains the virtual circuit connection. A virtual circuit connection consists of a first dedicated virtual circuit 1 from a first device to a second device through at least one switch. Additionally, a dedicated virtual connection consists of a second dedicated virtual circuit 2 from a second device to a first device through at least one switch. These two dedicated real circuits form a bi-directional path between a first device and a second device path for information transfer through at least one switch. For Class 4, the first device and the second device are active participants in setting up the Class 4 virtual circuits. In Class 4, some amount of bandwidth, up to one hundred percent (100%) of the available bandwidth is allocated and guaranteed in each of two dedicated virtual circuits. In addition, the maximum latency across the switched fabric is guaranteed and known, between the first and second devices through at least one switch.

Class 4 is a user class of service. Although highly desirable to support real time or metered delivery applications, the problem with Class 4 is that it is not deployed by any device or switch manufacturer; it is just a concept with special requirements that are not compatible with presently deployed devices or switches.

Some issues with Class 4 in regards to deployed Fibre Channel switches utilizing Class 2 and Class 3 are: unique start of frame delimiters that no one generates or recognizes in hardware today; unique flow control mechanism not implemented in any hardware today; would require all ports in the system; both the end node devices as well as switch ports to implement the Class 4 features (if any port does not support class 4 no application may use it); the end-to-end setup protocol as defined in the standard is incorrect or broken and will not work (some engineers claim that Class 4 itself can never work in a practical system).

Class 6

Class of Service 6 is a dedicated connection service that supports multicast operations (i.e., one information frame from one device sent to a plurality of second devices). Class of Service 6 shares the same attributes as Class 1 above. In fact, Class 6 is really just a definition of a reliable multicast feature for Class 1.

Class F

Class of Service F is a connectionless service that is restricted to use only by switches (it is not a user class of service), when communicating with each other. Class of Service F shares the same attributes as Class 2 above, but it is restricted to use only within and between switches.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:

receiving one or more frames, wherein each frame contains non-Quality-of-Service (non-QoS) header information;

classifying the one or more frames to associate one or more of the frames with a Quality-of-Service (QoS) circuit based on the corresponding non-QoS header information wherein each frame has an associated QoS requirement that corresponds to one of the QoS circuits; and scheduling delivery of the one or more frames based upon the corresponding frame classifications, wherein non-QoS frames in classifications corresponding to Quality-of-Service (QoS) circuits are scheduled in a manner that meets the QoS requirements associated with the QoS circuits corresponding to the frames.

2. The method of claim 1, wherein the one or more frames comprise non-QoS frames.

3. The method of claim 2, wherein the one or more frames comprise Fibre Channel Class 2 or Class 3 frames.

4. The method of claim 1, further comprising storing each of the one or more frames in a queue, wherein the queue is selected based upon the classification of the frame.

5. The method of claim 1, further comprising defining header information criteria corresponding to one or more QoS circuits, wherein classifying the one or more frames comprises identifying ones of the frames for which the corresponding header information meets the defined criteria.

6. The method of claim 5, further comprising allocating a queue for each of the defined QoS circuits from a pool of buffer space and storing frames classified as corresponding to each QoS circuit in the corresponding queue.

7. The method of claim 6, wherein buffer space is dynamically allocated to each queue as needed to store the corresponding frames.

8. The method of claim 5, further comprising deallocating at least one of the QoS circuits by successively notifying each switch in the path of the at least one QoS circuit that the at least one QoS circuit is deallocated, beginning with a switch nearest a source node and ending with a switch nearest a destination node.

9. The method of claim 8, further comprising notifying additional switches that support QoS in a corresponding switching fabric that the at least one QoS circuit is deallocated.

10. The method of claim 1, wherein the method is implemented in a switching fabric and wherein the method further comprises identifying a level of QoS supported by each switch in the switching fabric.

11. The method of claim 10, wherein information identifying the level of QoS supported by each switch in the switching fabric is communicated to each of the switches that support QoS.

12. The method of claim 1, wherein the one or more frames are scheduled according to a modified bin-filling algorithm in which bins corresponding to each of one or more QoS classifications are filled, first with frames having the classifications of the corresponding bins, and then with frames having other classifications.

13. A system comprising:

one or more input ports;

one or more output ports;

one or more queues; and a processor coupled to the input ports, the output ports and the queues;

wherein the processor is configured to examine non-Quality-of-Service (non-QoS) headers of frames received at the input ports, classify the frames to associate one or more of the frames with a Quality-of-Service (Qos) circuit based on corresponding non-QoS header information wherein each of the frames has an associated QoS requirement that corresponds to one of the QoS circuits, and schedule transmission of non-QoS frames based on the respective classifications of the non-QoS frames from the output ports in a manner that meets the QoS requirements associated with the QoS circuits corresponding to the frames.

14. The system of claim 13, further comprising one or more queues, wherein each queue corresponds to a frame classification, and wherein each frame is stored in a queue corresponding to the classification of the frame.

15. The system of claim 14, further comprising a decision buffer, wherein the processor is configured to store each frame in the decision buffer, to examine the header information of the frame and classify the frame while the frame is stored in the decision buffer, and to forward the frame from the decision buffer to a queue corresponding to the classification of the frame.

16. The system of claim 13, wherein the system comprises a Fibre Channel switch.

17. The system of claim 16, wherein the system is configured to process Fibre Channel Class 2 or Class 3 frames.

18. The system of claim 13, wherein the processor is configured to dynamically allocate buffer space to the one or more queues from a buffer pool.

19. The system of claim 18, wherein the processor is configured to implement the queues as linked lists.

20. The system of claim 13, wherein the system is one of a plurality of switches in a switching fabric and wherein the processor is configured to maintain information identifying levels of Quality-of-Service (QoS) supported by one or more additional switches in the switching fabric.

21. The system of claim 13, wherein the processor is configured to schedule the frames according to a modified bin-filling algorithm in which bins corresponding to each of one or more QoS classifications are filled, first with frames having the classifications of the corresponding bins, and then with frames having other classifications.

22. The system of claim 13, further comprising a deep buffer configured to receive the frames from the input ports, wherein the deep buffer is configured to store bursts of frames without blocking receipt of additional frames.

23. The system of claim 13, wherein the system comprises a plurality of switches, each switch having:

one or more output ports;

one or more queues; and a processor coupled to the input ports, the output ports and the queues;

wherein the processor is configured to examine non-Quality-of-Service (non-QoS) headers of frames received at the input ports, classify the frames to associate one or more of the frames with a Quality-of-Service (QoS) circuit based on corresponding non-QoS header information, and schedule transmission of the frames based on the respective classifications of the frames from the output ports.

24. The system of claim 23, wherein the plurality of switches provide homogeneous levels of QoS capabilities.

25. The system of claim 23, wherein the plurality of switches provide heterogeneous levels of QoS capabilities.

26. The system of claim 23, wherein the plurality of switches are configured to provide QoS capabilities for delivery of Fibre Channel Class 2 or Class 3 frames between legacy Fibre Channel Class 2 or Class 3 devices.

27. The system of claim 23, wherein in response to one of the switches requesting a QoS circuit, each of the switches determines whether the switch is in a best path and whether the switch has the resources to set up the QoS circuit.

* * * * *